United States Patent
Vaez-Zadeh et al.

(10) Patent No.: US 7,768,227 B2
(45) Date of Patent: Aug. 3, 2010

(54) EFFICIENCY MAXIMIZATION CONTROL AND VARIABLE SPEED DRIVE OF SINGLE PHASE INDUCTION MOTORS

(76) Inventors: Sadegh Vaez-Zadeh, North Karegar Ave, School of Engineering, University of Tehran, Tehran, TE (IR) 14395515; Bijan Zahedi, North Karegar Ave, School of Engineering, University of Tehran, Tehran, TE (IR) 14395515

( * ) Notice: Subject to any disclaimer, the term of this patent is extended or adjusted under 35 U.S.C. 154(b) by 328 days.

(21) Appl. No.: 12/110,293

(22) Filed: Apr. 26, 2008

(65) Prior Publication Data
US 2008/0218118 A1    Sep. 11, 2008

(51) Int. Cl.
*H02P 27/08* (2006.01)

(52) U.S. Cl. .................. 318/801; 318/701; 318/802; 318/811

(58) Field of Classification Search ............ 318/400.34, 318/701, 801, 802, 811
See application file for complete search history.

(56) References Cited

U.S. PATENT DOCUMENTS

| | | | |
|---|---|---|---|
| 4,409,528 A | 10/1983 | Podell | |
| 4,455,521 A | 6/1984 | Day | |
| 4,566,289 A | 1/1986 | Lizuka | |
| 4,706,180 A | 11/1987 | Wills | |
| 4,782,282 A * | 11/1988 | Bachman | 324/668 |
| 5,173,651 A * | 12/1992 | Buckley et al. | 318/701 |
| 5,252,905 A | 10/1993 | Wills | |
| 5,475,293 A * | 12/1995 | Sakai et al. | 318/802 |
| 5,670,858 A | 9/1997 | Health | |
| 6,046,554 A * | 4/2000 | Becerra | 318/400.34 |
| 6,570,778 B2 | 5/2003 | Lipo | |
| 7,017,377 B2 * | 3/2006 | Hosoito et al. | 68/12.16 |

* cited by examiner

*Primary Examiner*—Paul Ip
(74) *Attorney, Agent, or Firm*—Barry Choobin; Chobin & Chobin Consultancy L.L.C.

(57) ABSTRACT

A control method and a control system for single phase induction motors driven by two-power electronic switch inverter are disclosed. The system fulfills two main tasks i.e. precise motor speed control and maximum motor efficiency control over wide ranges of motor load and speed command without a motor speed feedback.

12 Claims, 5 Drawing Sheets

EFFICIENCY MAXIMIZATION CONTROL AND VARIABLE SPEED DRIVE OF SINGLE PHASE INDUCTION MOTORS

FIELD OF THE INVENTION

The present invention relates to motor control systems and more particularly to the control of single phase alternating current induction motors.

BACKGROUND OF THE INVENTION

A Single phase induction motors (SPIM) need an auxiliary winding in parallel with motor main winding for starting. Also, there should be a current phase difference between the main and auxiliary windings of SPIMs. This is usually facilitated by inserting a capacitor in series with the auxiliary winding. The auxiliary winding and the capacitor may also improve the motor performance if they are not disconnected from the supply after starting. Such a capacitor is preferred to be adjusted to provide a close to 90° phase differences between currents of the two windings. This results in a balanced motor operation. However, in variable speed drives, the 90° can not be maintained at non-rated speeds unless the capacitor impedance is readjusted to an optimized value at each supply frequency by additional means. Therefore, the balanced operation can not be provided and the motor efficiency reduces without capacitor readjustment.

Variable speed drives improve energy efficiency. If they are implemented with efficiency optimizing schemes, even more energy saving is gained. Various variable speed drives and efficiency optimization schemes have been proposed for SPIMs. U.S. Pat. No. 4,455,521 has presented a circuit for controlling the operation of a SPIM to obtain maximum motor efficiency over an entire range of load conditions. It has used a well known stator voltage control method to reduce motor flux when motor load decreases. This is a constant frequency control and doesn't provide variable speed capability for motor. Similar methods of stator voltage control for constant speed applications have been used in U.S. Pat. No. 4,409,528 and U.S. Pat. No. 5,670,858.

A single phase sinusoidal shaped variable voltage variable frequency waveform has been proposed in U.S. Pat. No. 4,706,180 for driving a single phase ac induction motor by employing a sinusoidal pulse width modulated signal to switch a pair of solid state power switches. In U.S. Pat. No. 5,252,905 a variable frequency driving system has additional options: an ac power line for providing single phase ac power line voltage at a fixed frequency to drive the motor at an adjustable speed. The last two patents concentrate on the improvement of power supply specifications. However, control of motor and improvement of its performance are not considered. In U.S. Pat. No. 4,566,289, a refrigerator control system has been implemented by a change-over device to drive a motor both through an inverter at reduced speed and directly by a commercial power supply at a nominal speed. As a result, the inverter loss is eliminated when it is bypassed and the total efficiency of the refrigerator increases. This idea has been used in U.S. Pat. No. 6,570,778 B2 in a different way such that the main winding of the motor is supplied directly from ac power line to develop start-up torque; while in lower speed values the motor is supplied by an inverter. In the last two patents, motor efficiency may decrease substantially at non-rated frequencies when the motor is supplied from the inverter or under non-rated loads.

In the present invention a low cost variable speed drive for SPIMs is proposed to control motor speed and maximize motor efficiency over the entire speed range.

SUMMARY OF THE INVENTION

A low cost variable speed single phase induction motor drive is much needed for many applications. The proposed invention provides such a drive with a minimum number of components and without a mechanical sensor. The drive is controlled by a simple and effective control system which optimizes motor efficiency at every operating point regardless of its controlled speed and load.

This invention uses the fact that the phase difference of the main and auxiliary winding currents is a motor variable which influences major motor characteristics and can be used in the determination of motor performances. It is claimed in this invention that this variable is independent of motor load and depends only on motor supply frequency. It is proposed in the present invention to control this angle.

The invention makes it clear that there is an optimal motor slip, at each motor frequency, corresponding to a maximum motor efficiency. However, using motor slip as a means of efficiency optimization requires an expensive speed sensor which is not favored in SPIM drives. It can be shown that the motor slip is a function of the currents phase angle. As so, in every frequency there is a unique optimal currents phase angle corresponding to a maximum efficiency.

Therefore, it is proposed in this invention to control the phase angle as a means of efficiency optimization control of SPIMs. On the other hand, by controlling the phase angle, the motor slip, and in turn the motor speed is controlled. This results in a precise motor speed at every specific supply frequency despite load variation. Therefore, the present invention materializes a variable speed control together with an efficiency optimization control by a simple and low cost system.

DETAILED DESCRIPTION OF THE INVENTION

Figure 1:
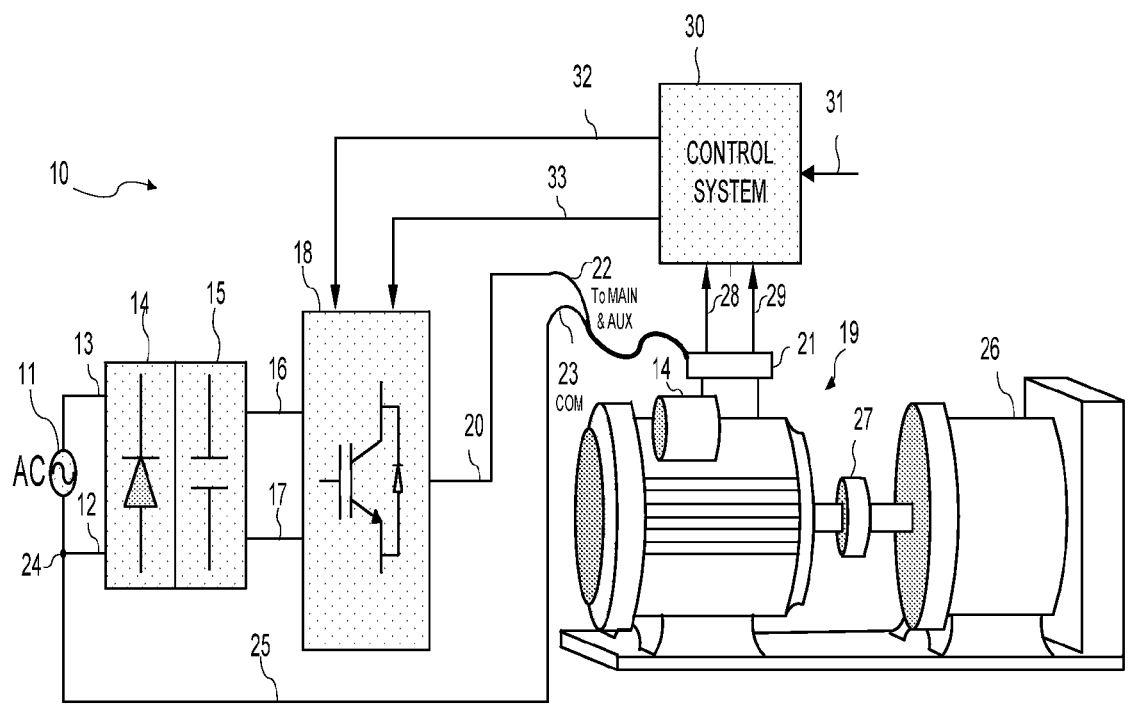
FIG. 1 is an overview of a system that controls the SPIM according to the invention.

With reference to the drawings, a low cost drive system for single phase induction motors is illustrated as 10 in FIG. 1. The drive 10 receives electric power from a single phase ac power supply 11. Two input lines 12 and 13 connect ac power supply 11 to a rectifier 14 and a capacitor filter 15 which provide DC power through DC bus lines 16 and 17. The DC voltage on 16 and 17 is connected to an inverter 18. The inverter 18 can provide a variable voltage/variable frequency sinusoidal pulse width modulation supply, and supplies a single phase induction motor 19 through an output line 20 that is connected to the motor terminal box 21 through the motor supply cable 22. The motor ground cable 23 is connected to the null of the ac power supply 24 through a line 25. The motor 19 is coupled to a load 26 through a coupler device 27. Two motor signals 28 and 29 that are in proportion to the motor winding currents are delivered to a control block 30 which commands the inverter 18 according to a user speed reference 31, through two control lines 32 and 33.

Figure 2:
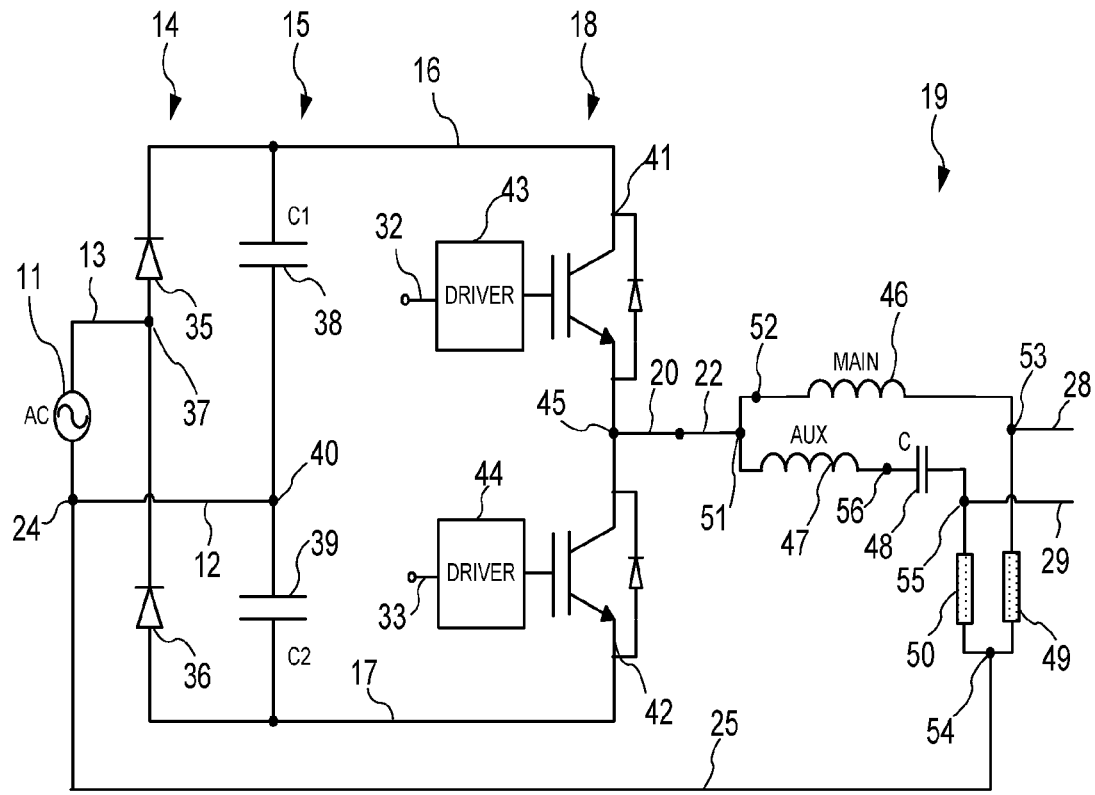
FIG. 2 is a schematic representation of the control system circuit diagram of the present invention that connects to a SPIM.
Figure 3:
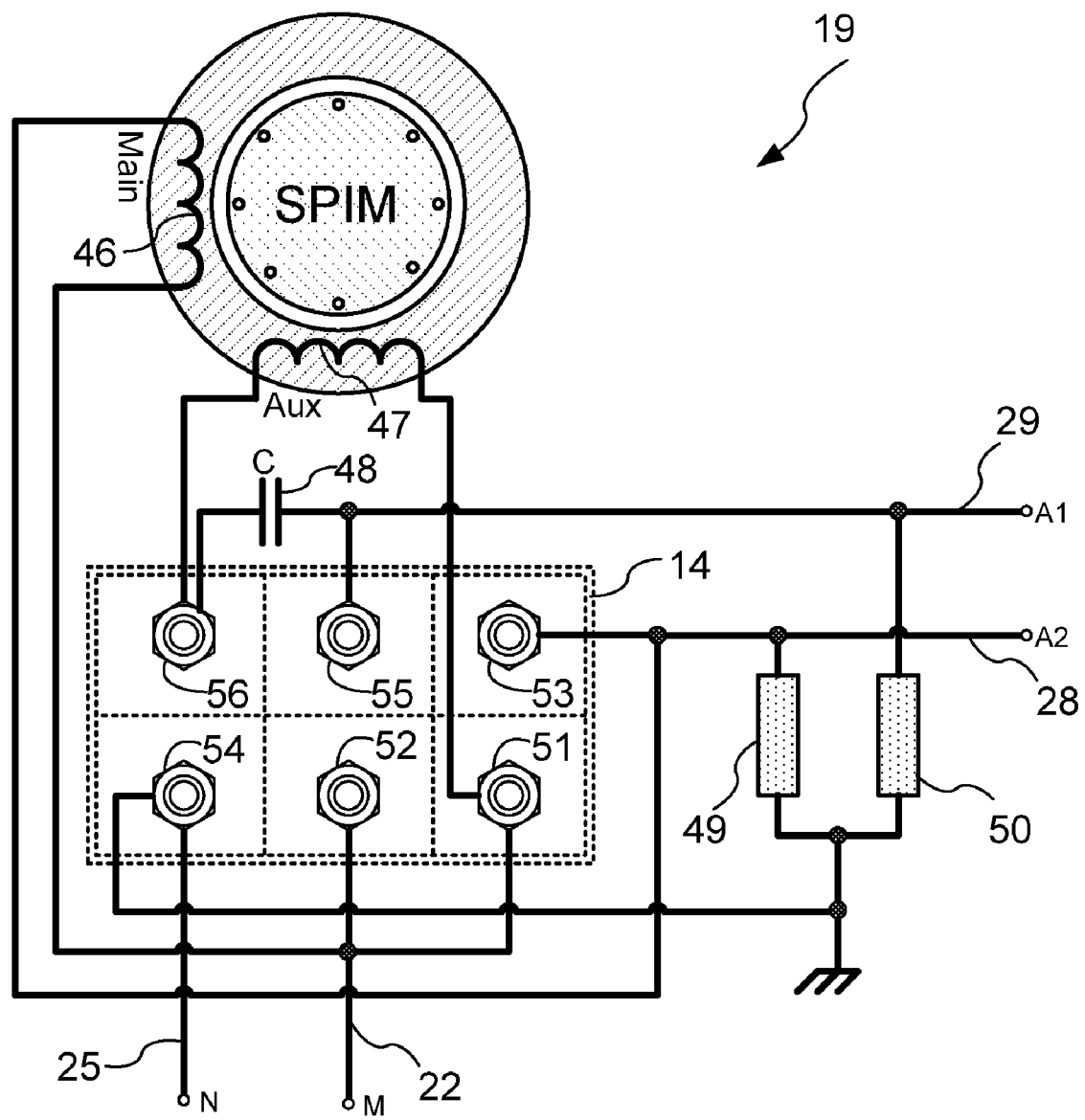
FIG. 3 is the terminal box of the SPIM and its connections to internal and peripheral elements.

FIG. 2 illustrates the rectifier 14, the capacitor filter 15, the inverter 18 and the motor 19 in more details. The rectifier 14 includes two diodes 35 and 36 connected together at a node 37 to which the ac supply line 13 is connected to the pair of diodes 35 and 36 across DC bus lines 16 and 17. The capacitor filter 15 includes two capacitors 38 and 39, connected together at a node 40 to which the ac null line 12 is connected. The pair of capacitors 38 and 39 also is connected across DC bus lines 16 and 17 to filter the rectified voltage by the rectifier 14 to provide fairly constant DC bus voltage across the lines 16 and 17. The inverter 19 is implemented by power electronic switches, such as IGBTs 41 and 42 shown in FIG. 2 that are driven by gate drivers 43 and 44 which receive control signals from the control block 30 through the control lines 32 and 33. The pair of IGBTs 41 and 42 are connected across DC bus lines 16 and 17, and they are connected together at a node 45 which the inverter output line 20 is connected to and extends to the motor terminal box 21 through the motor supply cable 22. The single phase induction motor 19 includes a main winding 46, an auxiliary winding 47, a phase shifting capacitor 48 and a terminal box 21 that are shown in FIG. 2 by 19 and in FIG. 3 by 19. The main winding circuit includes the main winding 46 and a very small resistor 49 in series with 46 for main winding current sampling. The auxiliary winding circuit includes the auxiliary winding 47 and another small resistor 50 the same as resistor 49 in series for auxiliary winding current sampling. In FIGS. 2 and 3 it is shown that the motor supply cable 22 is connected to the first terminal 51 of auxiliary winding 47 and the first terminal 52 of main winding 46. The main winding is connected to the resistor 49 at terminal 53 and through that resistor 49 is connected to a null connection at terminal 54. The auxiliary winding 47 is connected to capacitor 48 at terminal 56, and the capacitor 48 is connected to resistor 50 at terminal 55 and through that resistor 50 is connected to the null connection at terminal 54. The terminal 54 is connected to the null of ac power supply through the line 25. Two output signal lines 28 and 29 are in proportion to windings currents and are extended to control block 30.

Figure 4:
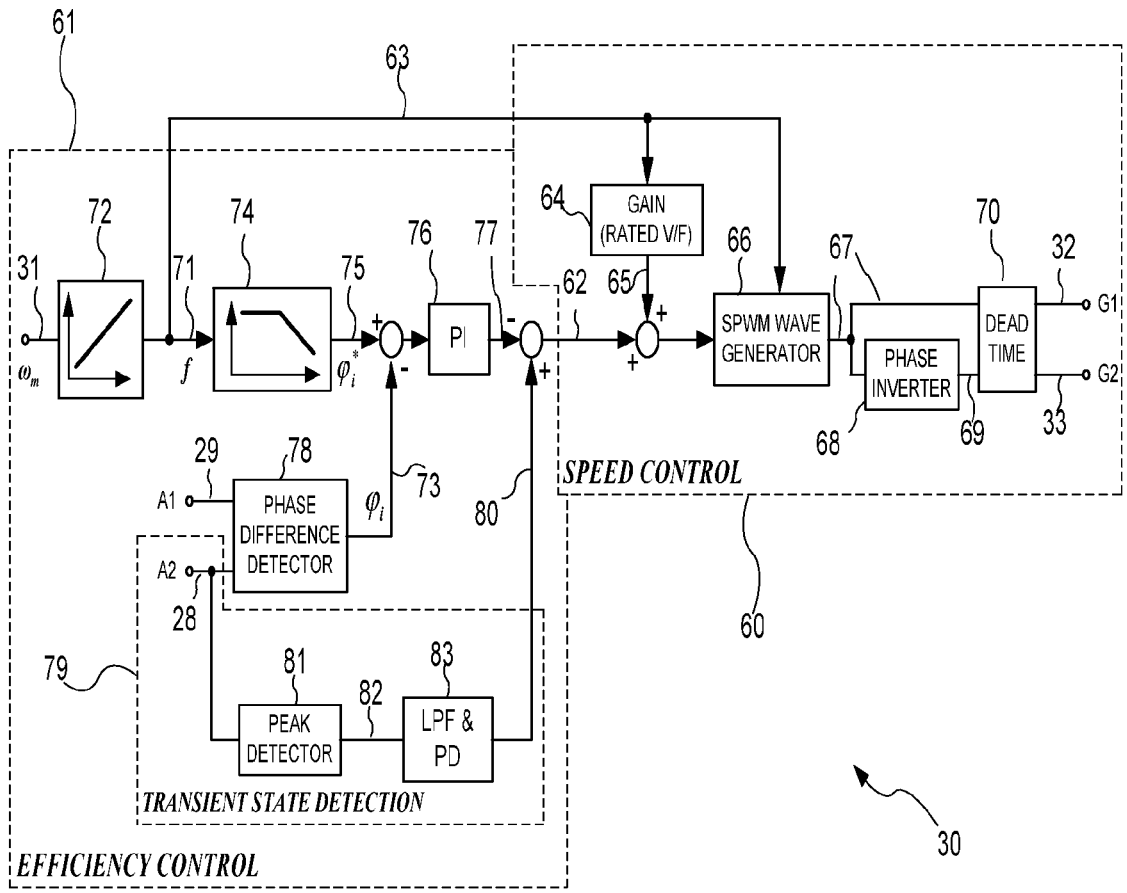
FIG. 4 is a block diagram of the control system that divides into two main blocks, the efficiency control block and the speed control block.
Figure 5:
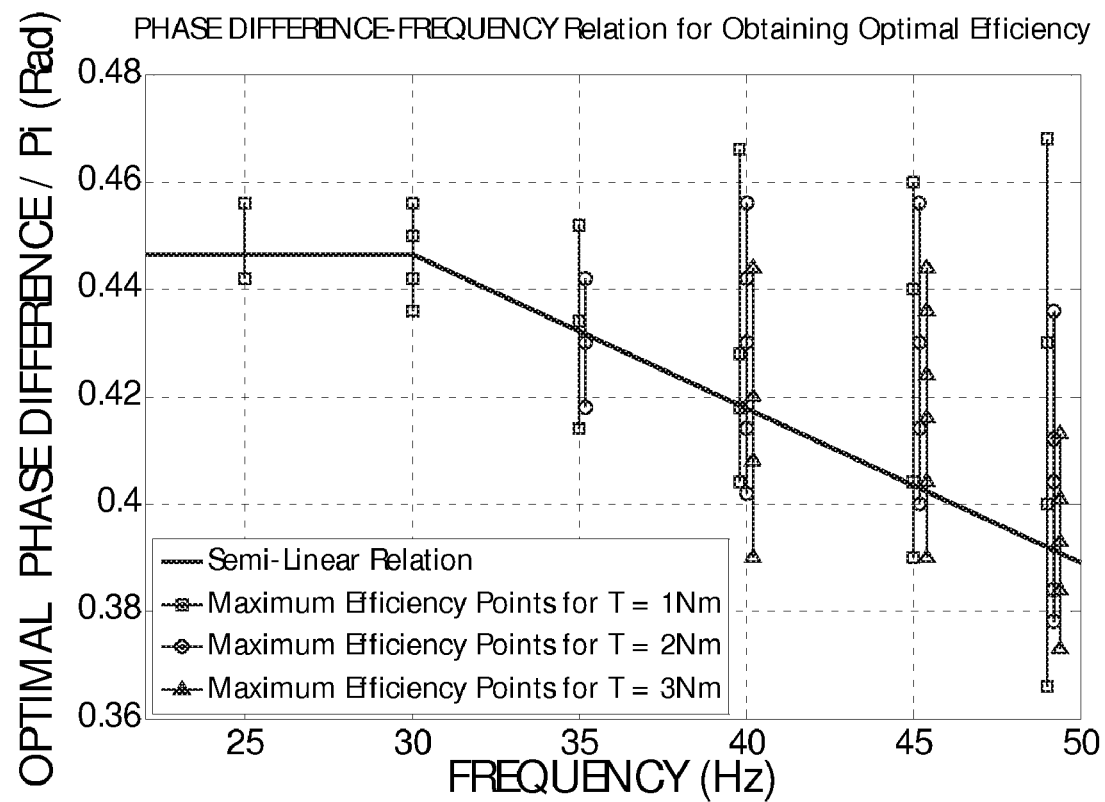
FIG. 5 is a curve fitted by a first order function on the experimental values of optimal windings currents phase difference.

FIG. 4 shows the details of control system 30. It is divided into two interrelated control subsystems 60 and 61, where the former is a speed control subsystem 60, and the latter is an efficiency control subsystem 61. The speed control subsystem 60 receives a frequency input value 63 as an input of a SPWM wave generator 66. Another input of the SPWM wave generator 66 is the amplitude of voltage and is provided by multiplying 63 to a gain 64 that is a rated V/f value; therefore, corresponding value of motor voltage 65 is obtained. Then, SPWM wave generator 66 according to frequency value 63 and voltage value 65 generates a SPWM wave on 67. Phase inverter 68 provides another SPWM wave that is an inverted signal of 67. According to SPWM waves 67 and 69, a block 70 provides two SPWM signals 32 and 33 with considering dead time between them to be applied to inverter 19 and its switches' drivers 43 and 44. Without the efficiency control subsystem and the proposed inter-related speed control subsystem, the speed control could have been a feed-forward speed control by which the motor speed changed with load changes. In addition it would have not had any control to improve efficiency. With utilizing the efficiency control subsystem 61 and applying its output 62 to speed control subsystem 60, both efficiency maximization and steady-state speed control are obtained. User speed reference 31 enters to efficiency control subsystem 61 and is transformed to a frequency value 71 by block 72. The relation of speed and frequency is a definite curve that can be obtained from experimental tests or simulation results. Because of little motor slip, it can be estimated as a first order function with very low error. So, it is applied in block 72. This relation is satisfied when windings currents phase difference 73 is adjusted to a constant value commanded by 75 and through controller 76. This controller maintains it at a constant value in steady state mode. The constant value of windings currents phase difference is selected according to efficiency maximization curve presented in block 74. We proved analytically for single phase induction motors with an auxiliary winding that at each motor supply frequency, the motor efficiency relates to windings currents phase difference only. The efficiency maximization curve embedded in block 74, presents the corresponding windings currents phase difference that maximizes the motor efficiency for various motor supply frequencies. It is based on a first order function that is fitted to the desired values of windings currents phase differences under various load conditions at various motor supply frequencies obtained by experiments as in FIG. 5. So, we can maximize the motor efficiency in various load conditions if we control the windings currents phase difference at various frequencies according to this curve. Therefore, block 74 obtains the desired value for windings currents phase difference 75 from frequency 71 and a Proportional-Integrator controller 76 controls the actual windings currents phase difference 73 at desired value 75. The output of PI controller 77 is deducted from the voltage value 65 and the result is applied to the SPWM generator 66. The actual windings currents phase difference 73 is obtained by the phase difference detection block 78 which detects phase difference of two signals 28 and 29 that are in proportion to motor windings currents. As the efficiency control is a steady-state control, it may not control the motor transient behavior well. Therefore, a transient state detection block 79 is considered that neutralizes the effect of PI control output by adding a desired value 80 to PI output 77 in transient state. Transient state of motor performance is detected with peak detection of signal 28 that is in proportion to main winding current by a peak detector 81. For tailoring the peak detector output value to the desired value 80, a feed-forward controller 83 is used which includes a low pass filter and a Proportional-Deriver controller. Before the PD controller, the low pass filter eliminates high frequency noises to prevent amplifying them by PD controller.

It is understood that the invention is not confined to the particular embodiments set forth herein as illustrative, but embraces all such forms thereof as come within the scope of the following claims.

What is claimed is:

1. A control system for variable speed single phase induction motors consisting:
    an input as a motor speed command;
    a first input and a second input;
    a first current sensor and a second current sensor wherein said first and said second current sensors are mounted on motor windings, and wherein said first input and said second input are outputs of said first current sensor and said second current sensor respectively;
    two interrelated control subsystems;
    a variable frequency open loop speed control subsystem;
    a variable speed motor efficiency control subsystem;

a first link and a second link, wherein said first link and said second link, link said efficiency control subsystem to said speed control subsystem;

a first output and a second output, wherein said first output and said second output are connected to a two switching device inverter, thereby obtaining a maximum motor efficiency and controlling the motor speed over a wide motor load and speed ranges without any mechanical sensor.

2. A control system as claimed in claim 1, wherein said efficiency control subsystem further comprises;

an input as the motor speed command;

a frequency block, wherein said frequency block characterized with the motor speed command as its input and a predetermined frequency valued signal as its output;

a currents phase difference detector, wherein said detector determines actual phase difference between main and auxiliary windings currents;

a proportional integral controller;

a transit state detector; and an output voltage signal as an input to the motor speed control subsystem.

3. A control system as claimed in claim 2, wherein said motor control subsystem further comprises;

a first input signal and a second input signal, wherein said first input signal is the frequency valued signal and said second input signal is voltage signal, wherein said first and said second signals characterize as outputs of said efficiency control subsystem, and wherein said signals link said efficiency control subsystem to said speed control subsystem;

a gain block, wherein said gain block provides a rated voltage by a voltage over frequency method;

a sinusoidal pulse width modulation wave generator;

a phase inverter; and a dead time provider.

4. A control system as claimed in claim 2, wherein said frequency block maps every motor speed command to an optimal supply frequency value, wherein said optimal supply frequency value at each speed command is independent of motor load conditions, thereby ensuring a maximum motor efficiency at a commanded speed.

5. A control system as claimed in claim 2, wherein said currents phase difference block utilizes a first order function between said optimal supply frequency and commanded windings currents phase difference, thereby ensuring maximum motor efficiency.

6. A control system as claimed in claim 5, wherein said function is independent of motor load conditions.

7. A control system as claimed in claim 5, wherein said currents phase difference block determines a commanded winding current phase difference corresponding to a maximum motor efficiency at any commanded speed over the entire motor load range.

8. A control system as claimed in claim 2, wherein said proportional integral controller receives error signals of commanded and actual windings currents phase difference signal and matches said actual windings currents phase difference signal to the commanded windings currents phase difference signal, thereby providing a voltage valued signal as its output signal, and said output signal compensated by output of said transient state detector, thereby forming the output of the efficiency control subsystem.

9. A control system as claimed in claim 2, wherein said transient state detector further comprises;

a peak detector of the actual winding current, a low pass filter and a proportional deriver controller to provide a voltage valued signal to compensate effect of efficiency control subsystem in motor transient state, thereby preventing instability.

10. A control system as claimed in claim 3, wherein said output of the efficiency control subsystem is deducted from said rated voltage, providing voltage command of said pulse width modulation wave generator, thereby maximizing motor efficiency.

11. A method for controlling the phase angle as a means of efficiency optimization control and speed control of SPIMs, said method consisting of: controlling motor slip wherein at every specific supply frequency a precise motor speed is obtained regardless of load variation.

12. A control system as claimed in claim 1, wherein said two switching inverter is a single phase variable voltage/variable frequency sinusoidal pulse width modulation inverter having two power switching devices driven by two gate drivers which receive control signals from said control system.

* * * * *